United States Patent
Kanjiyani et al.

(10) Patent No.: US 9,970,307 B2
(45) Date of Patent: May 15, 2018

(54) TURBINE NOZZLES WITH SLIP JOINTS IMPREGNATED BY OXIDATION-RESISTANT SEALING MATERIAL AND METHODS FOR THE PRODUCTION THEREOF

(71) Applicant: HONEYWELL INTERNATIONAL INC., Morristown, NJ (US)

(72) Inventors: Shezan Kanjiyani, Glendale, AZ (US); Bradley Reed Tucker, Chandler, AZ (US); Natalie Wali, Chandler, AZ (US); Daniel Hicks, Piedmont, SC (US); Bill Macelroy, Greer, SC (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 977 days.

(21) Appl. No.: 14/219,622

(22) Filed: Mar. 19, 2014

(65) Prior Publication Data
US 2015/0267550 A1  Sep. 24, 2015

(51) Int. Cl.
*F01D 11/00* (2006.01)
*B23P 15/04* (2006.01)
(Continued)

(52) U.S. Cl.
CPC .......... *F01D 11/005* (2013.01); *B23K 1/0018* (2013.01); *B23P 15/04* (2013.01);
(Continued)

(58) Field of Classification Search
CPC ........ F01D 11/005; F01D 9/041; F01D 9/044; B23K 1/0018; F05D 2300/182; B23P 15/02; B23P 15/04
See application file for complete search history.

(56) References Cited

U.S. PATENT DOCUMENTS 4,395,195 A  7/1983 DeCosmo et al.
4,869,645 A  9/1989 Verpoort
(Continued)

FOREIGN PATENT DOCUMENTS

DE  102005042747 A1  3/2007
EP  1207272 A2  5/2002
EP  1820875 A2  8/2007

OTHER PUBLICATIONS

Extended EP Search Report for EP 15151019.5-1610 dated Jan. 10, 2015.

*Primary Examiner* — Richard Edgar
*Assistant Examiner* — Michael Sehn
(74) *Attorney, Agent, or Firm* — Lorenz & Kopf, LLP (57) ABSTRACT

Embodiments of a turbine nozzle having slip joints impregnated by an oxidation-resistant sealing material are provided, as are embodiments of methods for the manufacture of turbine nozzles. In one embodiment, the method includes providing a support ring, a slip joint ring substantially concentric with the support ring and radially spaced apart therefrom, and a plurality of vanes fixedly coupled to the support ring. The plurality of vanes extends radially from the support ring into a plurality of circumferentially-spaced slots provided in the slip joint ring to form a plurality of slip joints therewith. The plurality of slip joints are impregnated with a silicon-modified aluminide sealing material. The silicon-modified aluminide sealing material impedes gas flow into the radial slip joints during operation of the turbine nozzle, while also fracturing to permit relative radial movement between the plurality of vanes and the slip joint ring along the plurality of slip joints.

20 Claims, 3 Drawing Sheets

(51) Int. Cl.
  *B23K 1/00* (2006.01)
  *F01D 9/04* (2006.01)
  *F01D 17/16* (2006.01)
  *B23K 101/00* (2006.01)
  *F01D 5/28* (2006.01)

(52) U.S. Cl.
  CPC ............ *F01D 9/041* (2013.01); *F01D 9/042* (2013.01); *F01D 17/162* (2013.01); *B23K 2201/001* (2013.01); *F01D 5/28* (2013.01); *F01D 11/00* (2013.01); *F05D 2300/182* (2013.01); *Y02T 50/673* (2013.01); *Y10T 29/49321* (2015.01)

(56) References Cited

U.S. PATENT DOCUMENTS

| | | | |
|---|---|---|---|
| 5,000,782 A * | 3/1991 | Olson | C23C 10/52 75/253 |
| 5,181,550 A | 1/1993 | Blazek et al. | |
| 5,290,143 A | 3/1994 | Kington et al. | |
| 5,332,360 A * | 7/1994 | Correia | F01D 9/042 29/889.21 |
| 5,630,700 A * | 5/1997 | Olsen | F01D 5/189 415/134 |
| 5,634,767 A | 6/1997 | Dawson | |
| 5,634,768 A * | 6/1997 | Shaffer | F01D 9/042 415/137 |
| 5,645,893 A * | 7/1997 | Rickerby | C23C 14/083 148/277 |
| 6,126,758 A | 10/2000 | Meelu et al. | |
| 6,164,903 A * | 12/2000 | Kouris | F01D 9/04 415/135 |
| 6,409,473 B1 | 6/2002 | Chen et al. | |
| 6,637,643 B2 | 10/2003 | Hasz et al. | |
| 6,648,597 B1 | 11/2003 | Widrig et al. | |
| 7,993,759 B2 | 8/2011 | Nagaraj et al. | |
| 8,047,771 B2 | 11/2011 | Tucker et al. | |
| 2006/0239825 A1 | 10/2006 | Rice et al. | |
| 2011/0243724 A1 | 10/2011 | Campbell et al. | |
| 2012/0003086 A1 | 1/2012 | Morris et al. | |
| 2012/0060721 A1 | 3/2012 | Kool et al. | |
| 2014/0169957 A1* | 6/2014 | Kanjiyani | F01D 1/04 415/202 |

* cited by examiner

TURBINE NOZZLES WITH SLIP JOINTS IMPREGNATED BY OXIDATION-RESISTANT SEALING MATERIAL AND METHODS FOR THE PRODUCTION THEREOF

STATEMENT REGARDING FEDERALLY-SPONSORED RESEARCH OR DEVELOPMENT

This invention was made with Government support under W911W6-08-2-0001 awarded the U.S. Army. The Government has certain rights in the invention.

TECHNICAL FIELD

The following disclosure relates generally to gas turbine engines and, more particularly, to turbine nozzles and methods for producing turbine nozzles having slip joints impregnated with an oxidation-resistant sealing material, such as a silicon-modified aluminide sealing material.

BACKGROUND

Gas turbine engines are often produced to include turbine nozzles, which meter combustive gas flow while also accelerating and turning the gas flow toward the blades of a turbine rotor positioned downstream of the nozzle. A turbine nozzle may be assembled from a number of separately-produced segments, which each include an arced segment of the inner endwall or ring, an arced segment of the outer endwall or ring, and one or more airfoils or vanes extending therebetween. Turbine nozzles of this type (referred to herein as "segmented turbine nozzles") may, however, be prone to gas flow leakage across the mating interfaces between adjoining segments and flange surfaces. Gas flow leakage may increase chargeable cooling flow to the cycle, reduce cooling flow from the combustor, and result in a direct penalty against overall gas turbine engine performance. As an alternative to segmented turbine nozzles, bi-cast turbine nozzles have been developed in which inner and outer rings are cast as unitary structures, which lack segment-to-segment interfaces across which leakage may occur. During production of a bi-cast turbine nozzle, the vanes are individually produced and then positioned in a mold for bonding to the inner ring and/or the outer ring. In certain cases, the vanes may only be affixed to one of the rings, while forming slip joints with the ring to which the vanes are not affixed. Such slip joints help alleviate thermomechanical fatigue by permitting relative radial movement between the turbine nozzle vanes and the turbine nozzle attachment points as thermal gradients develop across the turbine nozzle during operation of the gas turbine engine.

While providing the above-noted advantages, bi-cast turbine nozzles remain limited in certain respects. For example, by virtue of the manner in which the bi-cast turbine nozzles are produced, the application of the Thermal Barrier Coating (TBC) typically occurs after assembly of the turbine nozzle and bonding of the vanes. When the turbine nozzle is produced to include slip joints, the interior surfaces defining the slip joints may remain uncoated by the TBC. Unfilled clearances or air gaps may thus remain around the floating terminal ends of the vanes bounding the slip joints. During gas turbine engine operation, hot combustive gasses may be ingested into these gaps from the pressure side of the vane, flow underneath the vane footprint, and discharge to the suction side of the vane. Hot gas ingestion may cause oxidative damage to the slip joint surfaces and detract from the aerodynamic performance of the turbine nozzle. Over the lifespan of the turbine nozzle, oxidation and hot corrosion may further erode the uncoated surfaces of the slip joints resulting in increasingly large air gaps and still further reductions in the aerodynamic performance of the turbine nozzle.

It is thus desirable to provide embodiments of a method for manufacturing turbine nozzles including slip joints, which minimize hot gas ingestion into the slip joints and which provide oxidation and hot corrosion resistance during operation of the gas turbine engine. It would also be desirable if, in at least some embodiments, the manufacturing method enabled the production of bi-cast turbine nozzles; that is, turbine nozzles wherein the inner and outer rings are separately cast as unitary structures. It would also be desirable to provide embodiments of a turbine nozzle produced in accordance with such a fabrication method. Other desirable features and characteristics of the present invention will become apparent from the subsequent Detailed Description and the appended Claims, taken in conjunction with the accompanying Drawings and the foregoing Background.

BRIEF SUMMARY

Embodiments of a method for manufacturing a turbine nozzle having slip joints impregnated by an oxidation-resistant sealing material are provided. In one embodiment, the method includes providing a support ring, a slip joint ring substantially concentric with the support ring and radially spaced apart therefrom, and a plurality of vanes fixedly coupled to the support ring. The plurality of vanes extends radially from the support ring into a plurality of circumferentially-spaced slots in the slip joint ring to form a plurality of slip joints therewith. The plurality of slip joints are impregnated with a silicon-modified aluminide sealing material. The silicon-modified aluminide sealing material impedes gas flow into the radial slip joints during operation of the turbine nozzle, while also fracturing to permit relative radial movement between the plurality of vanes and the slip joint ring along the plurality of slip joints.

Embodiments of a turbine nozzle are also provided. In one embodiment, the turbine nozzle includes a support ring and a slip joint ring, which is substantially concentric with the support ring and radially spaced apart therefrom. The slip joint ring has a plurality of circumferentially-spaced slots therein. A plurality of vanes is fixedly coupled to the support ring and extends radially therefrom into the plurality of circumferentially-spaced slots such that a plurality of radial slip joints is formed between the plurality of vanes and the plurality of circumferentially-spaced slots. A silicon-modified aluminide sealing material is impregnated into the plurality of radial slip joints. The silicon-modified aluminide sealing material impedes gas flow into the radial slip joints during operation of the turbine nozzle, while fracturing to permit relative radial movement between the plurality of vanes and the slip joint ring.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The term "radial slip joint," the term "slip joint," and similar terms and phrases are utilized to denote an interface created between two closely positioned surfaces allowing relative radial movement therebetween. The closely positioned surfaces may be separated by an air gap or, instead, intervening structural elements and/or materials (e.g., sealing materials of the type described below) may be disposed between the neighboring surfaces.

Figure 1:
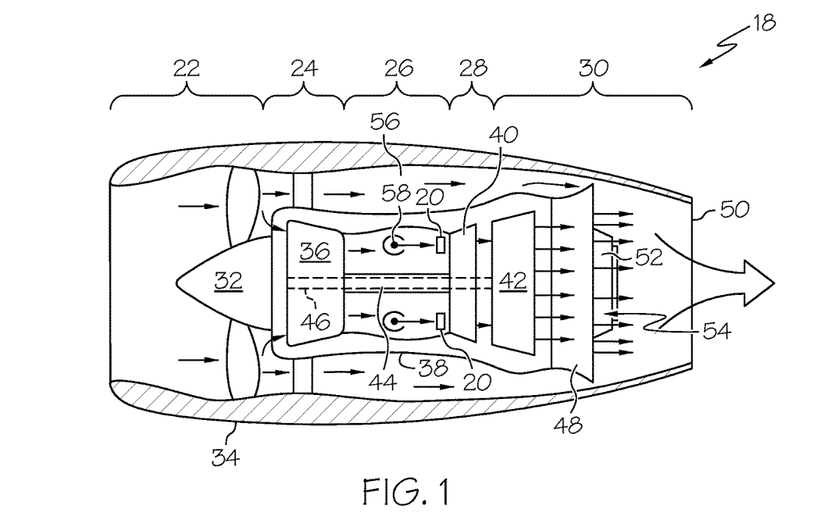
FIG. 1 is a cross-sectional schematic of an exemplary gas turbine engine including a turbine nozzle, which can be produced in accordance with an embodiment of the fabrication process described herein.

FIG. 1 is a cross-sectional schematic of an exemplary gas turbine engine (GTE) 18 including a turbine nozzle 20, which may be produced in accordance with the fabrication process described in detail below in conjunction with FIG. 5. By way example, GTE 18 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single axial compressor 36, which is rotatably disposed within an engine case 38 mounted within nacelle assembly 34. Turbine section 28 includes a high pressure (HP) turbine 40 and a low pressure (LP) turbine 42, which are rotatably disposed within engine case 38 in flow series. Turbine nozzle 20 is disposed downstream of combustion section 26 and immediately upstream of HP turbine 40. Although not shown in FIG. 1, a second turbine nozzle may likewise be disposed upstream of LP turbine 42. Compressor 36 and HP turbine 40 are mounted to opposing ends of an HP shaft 44, and intake fan 32 and LP turbine 42 are mounted to opposing ends of a LP shaft 46. LP shaft 46 and HP shaft 44 are co-axial; that is, LP shaft 46 extends through a longitudinal channel provided through HP shaft 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 18.

As illustrated in FIG. 1 and described herein, GTE 18 is offered by way of non-limiting example only. It will be readily appreciated that turbine nozzles of the type described herein can be utilized within various other types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. With respect to exemplary GTE 18, in particular, it is noted that the particular structure of GTE 18 will inevitably vary amongst different embodiments. For example, in certain embodiments, GTE 18 may include an exposed intake fan (referred to as an "open rotor configuration") or may not include an intake fan. In other embodiments, GTE 18 may employ centrifugal compressors or impellers in addition to or in lieu of axial compressors. In still further embodiments, GTE 18 may include a single shaft or three or more shafts along with varying numbers of compressors and turbines.

During operation of GTE 18, air is drawn into intake section 22 and accelerated by intake fan 32. A portion of the accelerated air is directed through a bypass flow passage 56, which is provided between nacelle assembly 34 and engine case 38 and conducts this airflow over and around engine case 38. The remaining portion of air exhausted from intake fan 32 is directed into compressor section 36 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to drive the rotation of HP turbine 40 and LP turbine 42. Turbine nozzle 20 further accelerates the combustive gas flow and helps to impart the gas flow with a desired tangential component prior to impingement upon the rotating blades of HP turbine 40. The rotation of turbines 40 and 42 drives the rotation of shafts 44 and 46, respectively, which, in turn, drives the rotation of compressor 36 and intake fan 32. The rotation of shafts 44 and 46 also provides significant power output, which may be utilized in a variety of different manners, depending upon whether GTE 18 assumes the form of a turbofan, turboprop, turboshaft, turbojet engine, or an auxiliary power unit, to list but a few examples. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 18 through propulsion nozzle 50 to produce forward thrust, although this may not be the case in alternative embodiments wherein GTE 18 assumes the form of, for example, a turboshaft engine.

Figure 2:
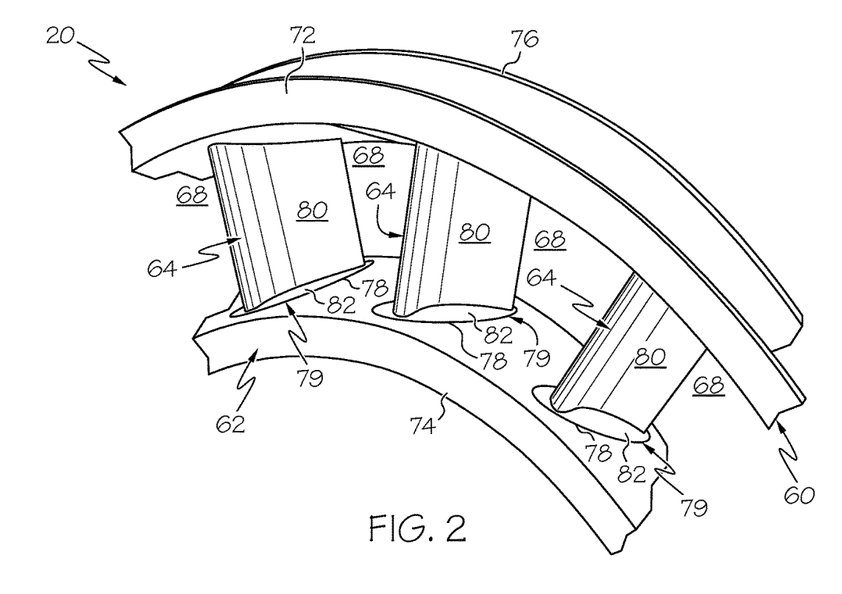
FIGS. 2 and 3 are isometric and cross-sectional views, respectively, of a portion of the turbine nozzle included in the gas turbine engine shown in FIG. 1, as illustrated in accordance with an exemplary embodiment.

FIG. 2 is an isometric view of a portion of turbine nozzle 20, as illustrated in accordance with an exemplary embodiment of the present invention. Turbine nozzle 20 includes an outer ring 60 (also commonly referred to as an "outer endwall" or "outer shroud"), an inner ring 62 (also commonly referred to as an "inner endwall" or "inner shroud"), and a plurality of airfoils or vanes 64. Outer ring 60 circumscribes, is radially spaced apart from, and is substantially concentric with inner ring 62. Outer ring 60, inner ring 62, and vanes 64 may be assembled such that vanes 64 are affixed to either ring 60 or ring 62 and form slip joints with the opposing ring, as described in detail below. Turbine nozzle 20 may be fabricated to include any number of flanges or other structural elements to facilitate mounting and piloting to the static infrastructure of GTE 18; e.g., as shown in FIG. 2, and provided solely by way of example, turbine nozzle 20 may be fabricated to include a first leading flange 72 extending radially outward from the forward circumferential edge of outer ring 60, a second leading flange 74 extending radially inward from the forward circumferential edge of inner ring 62, and a trailing flange 76 extending radially outward from the aft circumferential edge of outer ring 60.

Nozzle vanes 64 extend radially between outer ring 60 and inner ring 62 to define a number of combustive gas flow paths 68 through the body of turbine nozzle 20 (four of which can be seen FIG. 2). Each gas flow path 68 is defined by a different pair of adjacent or neighboring vanes 64; an inner surface of outer ring 60 located between the neighboring vanes 64, as taken in a radial direction; and an interior surface region of inner ring 62 located between the neighboring vanes 64, as taken in a radial direction. Gas flow paths 68 extend through turbine nozzle 20 in axial and tangential directions to guide combustive gas flow through the body of nozzle 20, while turning the gas flow toward the blades of HP turbine rotor 40 (FIG. 1). Gas flow paths 68 may constrict or decrease in cross-sectional flow area when moving in a fore-aft direction along which combustive gas flows during engine operation. Each flow path 68 thus serves as a convergent nozzle to meter and accelerate combustive gas flow through turbine nozzle 20.

Although only limited sections of rings 60 and 62 are shown in FIG. 2, it will be appreciated that rings 60 and 62 are annular structures, which are generally axisymmetric with respect to the rotational axis of GTE 18 and which extend fully therearound. In embodiments wherein turbine nozzle 20 is produced utilizing a bi-casting process of the type described below in conjunction with FIG. 5, rings 60 and 62 are cast as monolithic or continuous structures, which (in contrast to the rings of a segmented turbine nozzle) are uninterrupted by mating interfaces between adjoining segments. By virtue of this construction, leakage through turbine nozzle 20 and, specifically, leakage in radial directions across rings 60 and 62 may be minimized during operation of GTE 18 (FIG. 1) to optimize overall engine performance. This notwithstanding, embodiments of turbine nozzle 20 can be produced utilizing other types of fabrication methods suitable for producing slip joints impregnated with an oxidation-resistant sealing material of the type described below.

Inner ring 62 is fabricated to include a number of circumferentially-spaced cavities, depressions, or slots 78, which matingly receive the inner terminal ends of vanes 64 and cooperate therewith to produce a number of radial slip joints 79. The portions of turbine nozzle vane 64 extending between the inner circumferential surface of outer ring 60 and the outer circumferential surface of inner ring 62 are identified by reference numeral 80 and are referred to hereafter as the "main airfoil portions." By comparison, the portions of turbine nozzle vane 64 received within slots 78 (the floating terminal ends of vanes 64) are identified by reference numeral 82 and are referred to hereafter as the "airfoil extensions." A first end of main airfoil portion 80 is fixedly attached to (e.g., bonded to or integrally formed with) outer ring 60; e.g., in the illustrated example, the radially-outer end of main airfoil portion 80 is bonded to outer ring 60 utilizing, for example, a brazing process of the type described below. The opposing end of main airfoil portion 80 (the radially-inner end of main airfoil portion 80 in FIG. 2) is fixedly joined to airfoil extension 82 and is preferably integrally formed therewith as a single cast piece. The outer circumferential surface of airfoil extension 82 and the inner circumferential surface defining slot 78 create a relatively small clearance at the circumferential interface between the turbine nozzle vane 64 and inner ring 62. This circumferential clearance is shown more clearly in FIGS. 3 and 4, as described below.

Figure 3:
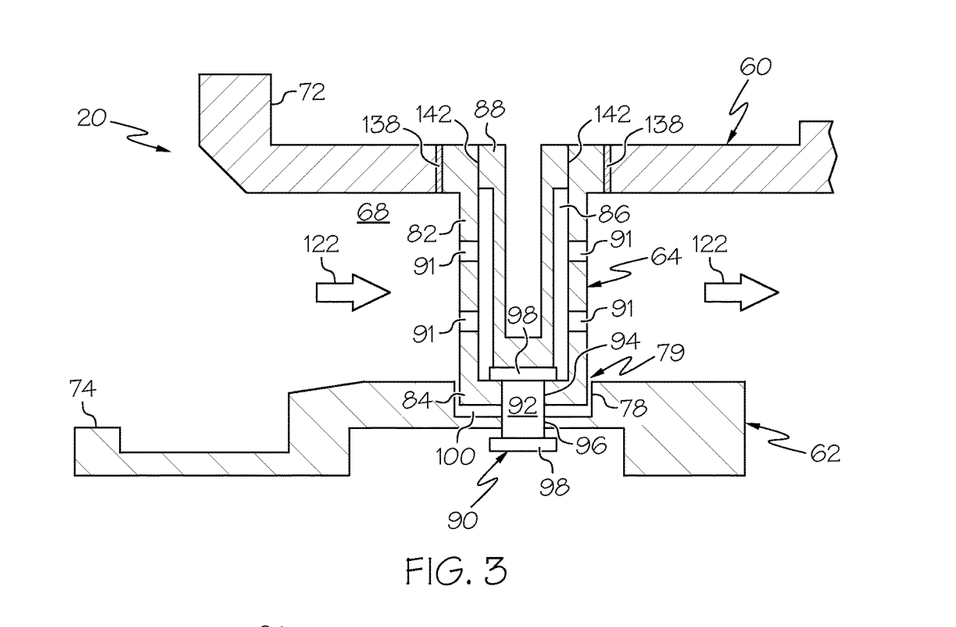
Figure 4:
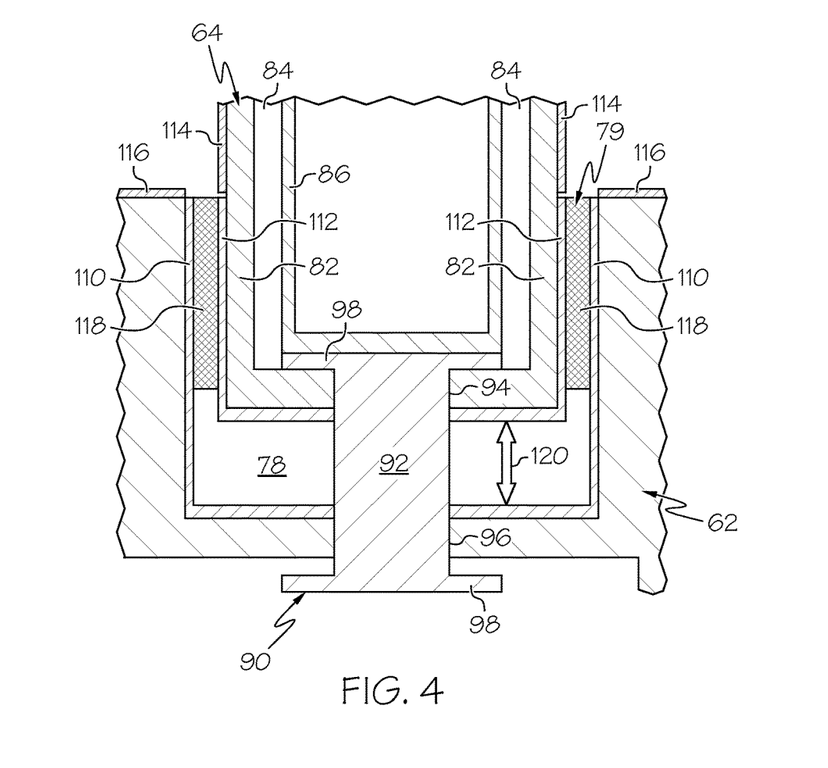
FIG. 4 is a cross-sectional view of a portion of the turbine nozzle shown in FIGS. 2-3 illustrating, in greater detail, one manner in which the slip joints may be impregnated with a slurry-applied, oxidation-resistant sealing material in accordance with embodiments of the present invention.

The ring or annular endwall to which turbine nozzle vanes 64 are affixed may be referred to herein as the "support ring," while the slotted ring or annular endwall forming radial slip joints with vanes 64 may be referred to herein as the "slip joint ring." In keeping with this terminology, the following description of the exemplary turbine nozzle 20 shown in FIGS. 2-4 will refer to outer ring 60 as "outer support ring 60" or, more simply, "support ring 60"; and to inner ring 62 as "inner slip joint ring 62" or, more simply, "slip joint ring 62." The exemplary embodiment shown in FIGS. 2-4 notwithstanding, it should be appreciated that embodiments of turbine nozzle 20 can be fabricated wherein turbine nozzle vanes 64 are affixed to (e.g., integrally formed with or bonded to) the inner ring and form radial slip joints with the outer ring. In such embodiments, the inner ring would be considered the "support ring," while the outer ring would be considered the "slip joint ring." Furthermore, the term "slot," as appearing herein, denotes any penetrating or non-penetrating opening, pocket, depression, or cavity formed in a slip joint ring that can cooperate with a turbine nozzle vane to form a slip joint of the type described herein. The slots will often assume the form of depressions having a planform shape conformal with that of the airfoil extensions and having an angularly spacing corresponding to that of the turbine nozzle vanes. The slots may be formed in or through the inner circumferential surface of the slip joint ring when the slip joint ring is the outermost ring of the turbine nozzle. Conversely, the slots may be formed in or through the outer circumferential surface of the slip joint ring when the slip joint ring is the innermost ring of the turbine nozzle.

With continued reference to the exemplary embodiment shown in FIG. 2, main airfoil portion 80 has a cross-sectional airfoil shape, which conditions combustive gas flow through turbine nozzle 20. Main airfoil portion 80 and airfoil extension 82 may have similar circumferential profiles or planform shapes. It is, however, preferred that airfoil extension 82 has an enlarged and gradually contoured circumferential profile, as compared to main airfoil portion 80, to lower tolerances and to allow a mating or conformal fit, and therefore a more uniform gap width, to be more easily created between airfoil portion 80 and the surrounding sidewalls defining each slot 78. For this reason, each airfoil extension 82 may be imparted with a substantially elliptical or ovular circumferential profile; and each slot 78 may likewise be formed to have a substantially elliptical or ovular circumferential profile. Such a gradually contoured surface and substantially uniform gap width also facilitates the deposition of sealing material into the slip joint to deter the inflow of combustive gasses into slots 78 during operation of turbine nozzle 20. The outer exposed surface of airfoil extension 82 may be contoured to form a smooth, substantially uninterrupted flow path with inner ring 62. As noted above, main airfoil portion 80 and airfoil extension 82 are preferably (although not necessarily) integrally formed as a single cast piece.

FIG. 3 is a cross-sectional view of turbine nozzle 20, taken along a cut plane through one of vanes 64. Certain additional structure features can be seen in FIG. 3, which were omitted or hidden from view in FIG. 2. These additional structures features include: (i) an inner cavity or hollow 86 provided in each vane 64, (ii) a cooling tube 88, which may be inserted into and nest within each hollow 86, and (iii) cooling channels or apertures 91, which may be provided through the sidewall of vanes 64. As further shown in FIG. 3, a plurality of radial retention pins 92 may be further provided between the floating terminal ends of vanes 64 and inner support ring 62 proximate slip joints 79. Radial retention pins 92 serve to prevent separation of airfoil extensions 84 from inner slip joint ring 62 in the unlikely event of airfoil burn-through. During assembly of turbine nozzle 20, retention pins 92 are inserted into aligning openings or radial bores 94 and 96 provided through terminal ends of vanes 64 and through the annular sidewall of inner ring 62, respectively. Thus, in the illustrated embodiment, radial retention pins 92 extend along axes substantially perpendicular to the longitudinal axis of turbine nozzle 20 from airfoil extensions 82, through radial pockets or gaps 100 provided under airfoil extension 82 (described below), and to inner ring 62. Retention pins 92 are each produced to include opposing enlarged heads 98, one of which is disposed within the inner cavity or hollow provided in a vane 64 and the other of which is disposed adjacent the inner circumference of inner ring 62. Enlarged pin heads 98 each have an outer diameter larger than the diameters of bores 94 and 96 to retain pins 92 in their desired position. At the same time, the shanks of pins 92 are provided with sufficient lengths to allow each pin 92 to slide radially with respect to its corresponding bore 96 to avoid obstructing relative radial displacement between vanes 64 and inner ring 62 during heating of turbine nozzle 20. In this manner, radial retention pins 92 slidably attach vanes 64 to inner ring 62 to permit relative radial movement between vanes 64 and ring, while retaining vanes 64 if airfoil burn-through should occur. If desired, retention pins 92 may be bonded to their corresponding vanes 64 utilizing, for example, strips of braze foil (not shown).

As indicated above, radial slip joints 79 are bound along their inner perimeter or circumference by airfoil extensions 82 and along their outer perimeter or circumference by the inner surfaces of inner ring 62 defining slots 78. A relatively small circumferential clearance or annular gap is created at the circumferential interface between the turbine nozzle vane 64 and slip joint ring 62. By comparison, a relatively large radial gap 100 is provided between the terminal end surface of airfoil extension 84 (i.e., the radially-inner end of airfoil extension 84 in the illustrated example) and the floor of slot 78 to accommodate relative radial movement between the turbine nozzle vane 64 and slip joint ring 62. While airfoil extensions 84 and slots 78 can be produced to relatively tight tolerances such that the circumferential gap or clearance between each extension 84 and its respective slot 78 is relatively small (e.g., on the order of 0.002 to 0.003 inch), gas flow leakage into slots 78 can still occur. Such gas flow leakage reduces the efficiency of turbine nozzle 20 and can potentially cause structural degradation due to hot gas corrosion, oxidation, thermal fatigue, erosion, and the like. Thus, to minimize gas inflow into radial slip joints 79, the circumferential clearances between airfoil extensions 84 and surrounding slots 78 are impregnated or infiltrated with an oxidation-resistant sealing material of the type described below.

The sealing material impregnated into radial slip joints 79 is preferably chosen or prevent interference with the sliding radial movement of the slip joints, to have a relatively high melt point to prevent melting or softening during operation of turbine nozzle 20, and to be reliably retained within the slips joints by, for example, formation of a relatively strong bond with the inner peripheral surfaces of slots 78 or the outer peripheral surfaces of airfoil extensions 84 (or a bond coat formed thereof, as described below in conjunction with FIG. 4). In certain embodiments, the selected sealing material or materials may initially be bonded to both the inner peripheral surfaces of slots 78 and the outer peripheral surfaces of airfoil extensions 84. However, in this case, a purposefully weak bond is created between the sealing material and the inner peripheral surfaces of slots 78 or the outer peripheral surface of airfoil extensions 84 such that the sealing material separates therefrom during operation of the turbine nozzle 20 to permit the desired slippage. Alternatively, the sealing material may be bonded to both the inner peripheral surfaces of slots 78 and the outer peripheral surface of airfoil extensions 84 and may fracture radially during usage to accommodate relative radial movement between airfoil extensions 84 and slip joint ring 62.

It is possible to impregnate radial slip joints 79 with a high temperature braze material. Examples of braze materials suitable for this process are described in co-pending U.S. application Ser. No. 13/719,566, entitled "TURBINE NOZZLES WITH SLIP JOINTS AND METHODS FOR THE PRODUCTION THEREOF," filed Dec. 19, 2012, assigned to the assignee of the present Application, and hereby incorporated by reference. However, while minimizing gas flow leakage into slip joints 79, such braze materials may be prone to excessive oxidation and hot corrosion during operation of the gas turbine engine. Additionally, such braze materials are often applied as a relatively complex, multilayer coating system including a grit-blasted layer and/or a thermally-grown oxide layer in addition to an underlying bond coat layer. It has been discovered that certain non-braze, oxidation-resistant sealing materials can be utilized to seal radial slip joints 79, while still providing the ability to smoothly fracture under relatively low shear loads and thus permit the desired radial movement between vanes 64 and inner slip joint ring 62. Advantageously, such oxidation-resistant sealing materials can be applied in slurry form and need not be subject to high temperature thermal processing surpassing the melt or softening point of the sealing material. In preferred embodiment, the oxidation-resistant sealing material is a silicon-modified aluminide material; that is, a material containing an aluminide as its primary metallic constituent, as well as at least five weight percent (5 wt %) silicon. Examples of suitable silicon-modified aluminide sealing materials are further discussed below. Such materials may be applied utilizing a relatively simple coating system (e.g., a coating system consisting of the sealing material and a single bond coat layer) or may be applied directly over the selected surfaces without additional coating layers thereby reducing the cost and duration of the turbine nozzle manufacturing process.

FIG. 4 is a more detailed cross-sectional view of the slip joint 79 shown in FIG. 3, which further illustrates a slip joint coating system that may be formed over selected surfaces of slip joint 79 (and the other non-illustrated slip joints included within turbine nozzle 20 shown in FIGS. 1-3). As can be seen, a first bond coat layer 110 has been formed over the interior surfaces of inner ring 62 defining the outer boundaries of slot 78. Similarly, a second bond coat layer 112 has been formed over the exterior surfaces of airfoil extension 94 defining the inner boundaries of slot 78. Bond coat layers 110 and 112 may be, for example, platinum aluminide (PtAl) layers or nickel-platinum aluminide layers (NiPtAl) formed utilizing a thermal spray process or other deposition process. By way of non-limiting example, bond coat layers 110 and 112 may be deposited to a thickness between about 0.0015 and about 0.0030 inch in an embodiment. In further embodiments, either or both of bond coat layers 110 and 112 may be omitted. When included within turbine nozzle 20, bond coat layers 110 and 112 may be formed prior to assembly of nozzle 20, as described below in conjunction with FIG. 5. In this case, bond coat layer 112 may terminate at or near main airfoil portion 82 of vane 64, which may be coated with a Thermally-Grown Oxide (TGO) layer 114. Similarly, bond coat layer 110 may terminate at or near the inner circumferential surface of inner ring 62 defining gas flow paths 68, which may likewise be coated with a TGO layer 116.

An oxidation-resistant sealing material is impregnated into slip joint 79 to form a seal layer 118 (essentially, a fracturable annular seal) between bond coat layers 110 and 112, when present. As described more fully below in conjunction with FIG. 5, the oxidation-resistant sealing material may be applied in a wet-state as a slurry, which is drawn into the circumferential gap provided between bond coat layers 110 and 112. The oxidation-resistant sealing material may then be dried and diffused into bond coat layers 110 and 112 (when present) at temperatures below the melt point of the material to form oxidation-resistant seal layer 118. As noted above, a silicon-modified aluminide material is preferably utilized to form oxidation-resistant seal layer 118. Such a silicon-modified aluminide layer provides excellent chemical compatibility with bond coats 110 and 112 when comprised of a PtAl or a NiPtAl material. As opposed to other braze-based sealing materials, elemental diffusion of such a silicon-modified aluminide layer into PtAl or NiPtAl bond coats generally does not detract from the performance of the bond coat and, instead, may impart the bond coats with improved oxidation protection properties. In one embodiment, the silicon-modified sealing material is composed of at least 50 wt % Al and at least 10 wt % silicon, as considered as a metallic powder prior to dissolution into slurry form. The silicon-modified sealing material may also contain lesser amounts (preferably up to about 5 wt %) of other metallic constituents, such as chromium, tantalum, titanium, or boron, depending upon desired properties. An example of a silicon-modified aluminide material suitable for usage in the formation of oxidation-resistant seal layer 118 is commercially marketed under the name "SER-MALOY™ J" by Praxair Surface Technologies, Inc., headquartered in Indianapolis, Ind. While commercially-available, this material has traditionally been utilized in high temperature coating applications and not as a fracture-prone gap fill material. In an embodiment, oxidation-resistant seal layer 118 is formed to have a thickness between about 0.001 and about 0.003 inch; the term "about," as appearing herein, denoting a disparity of less than 10%. In further embodiments, seal layer 118 may be thicker or thinner than the aforementioned range.

As indicated above, oxidation-resistant seal layer 118 forms a mechanically weak joint or body, which is prone to fracture when subject to sheer forces. As generally illustrated in FIG. 4, cracks or fractures develop within oxidation-resistant seal layer 118 between bond coat layers 110 and 112 (if present) and, more generally, between the interior surfaces of radial slip joints 79. Such fractures accommodate the relative radial movement occurring between turbine nozzle vane 64 and inner slip joint ring 62 when the turbine nozzle is exposed to hot combustive gas flow (as indicated in FIG. 4 by double-headed arrow 120). At the same time, such fractures are relatively tight or constricted and, thus, minimize hot gas ingestion into the unfilled space, clearance, or air pocket created in slip joints 79, which is located radially adjacent oxidation-resistant seal layer 118 and between the floating terminal ends of airfoil extensions 84 and the floors of slots 78. In this manner, hot gas ingestion into slip joints 79 is minimized when combustive gas flow is directed through nozzle 20 along gas flow paths 68 during operation of turbine nozzle 20 (represented in FIG. 3 by arrows 122).

Figure 5:
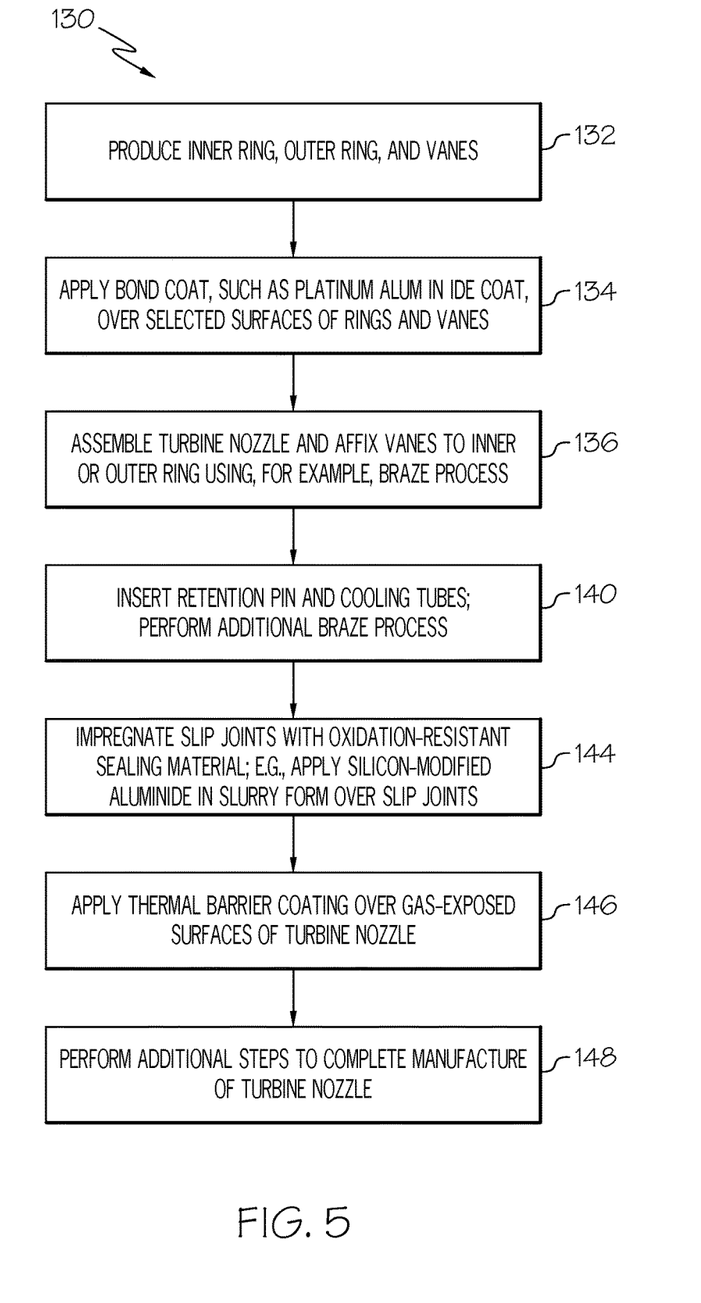
FIG. 5 is a flowchart setting-forth an exemplary method suitable for producing a turbine nozzle including slip joints impregnated with slurry-applied, oxidation-resistant sealing material, as illustrated in accordance with an exemplary embodiment of the present invention.

FIG. 5 is a flowchart illustrating an exemplary method 130 suitable for producing turbine nozzle 20 shown in FIGS. 1-4. Exemplary method 130 is provided by way of non-limiting illustration only with the understanding that embodiments of the turbine nozzle described herein can be produced utilizing various different types of manufacturing processes. Exemplary method 130 commences with the production of outer ring 60, inner ring 62, and vanes 64 (STEP 132). Outer ring 60 and inner ring 62 may be obtained (whether by independent fabrication or purchase from a supplier) in a near net form. In preferred embodiments, outer ring 60 and inner ring 62 are each cast as monolithic or continuous annular structures. A bond coat (e.g., bond coats 110 and 112 shown in FIG. 4) may be applied to all exterior surfaces of rings 60 and 62 (STEP 134). Afterwards, surfaces of rings 60 and 62 where the bond coat is not required may be subject to machining. Rings 60 and 62 may be subject to additional machining to define the more detailed structure features of turbine nozzle 20. For example, slots 78 may be formed in inner ring 62 utilizing, for example, an Electrical Discharge Machining (EDM) plunging technique. Vanes 64 may be individually cast from a chosen superalloy, such as a single crystal superalloy. If desired, cooling holes may be formed in vanes 64 (e.g., cooling holes 91 shown in FIG. 3) utilizing, for example, an EDM drilling technique.

Next, at STEP 136 of exemplary method 130 (FIG. 5), turbine nozzle 20 may be assembled utilizing a specialized fixture or mold. During assembly, the separately-cast vanes 64 may be inserted into radial openings provided in outer ring 60 and then joined thereto utilizing, for example, a brazing process. This results in the formation of braze joints 138 (identified in FIG. 3) between the adjoining surfaces of vanes 64 and outer ring 60. Bores 94 and 96 (FIGS. 3 and 4) may then be formed in vanes 64 and inner ring 62, respectively, utilizing an EDM drilling process; and radial retention pins 90 (FIGS. 3 and 4) may be installed through bores 94 and 96 (STEP 140) by, for example, inserting pins 90 in a radial direction through vanes 64 and then deforming or bonding an inner enlarged head 98 to each pin shank 92. Tack welds may be utilized to secure retention pins 90 in their desired position in an embodiment. Also, during STEP 140, cooling tubes 88 may be inserted into the inner cavities of vanes 64 and secured in place utilizing, for example, an additional brazing process to form braze joints 142 (identified in FIG. 3). The braze process may also melt or soften any braze material (e.g., a strip of braze foil) utilized to bond retention pins 90 to vanes 64 and/or to inner ring 62. With turbine nozzle 20 now fully assembled, the selected oxidation-resistant sealing material may be infiltrated into slip joints 79 to produce annular seal layers 118 (STEP 144), as described below.

Oxidation-resistant seal layers 118 are preferably formed within slip joints 79 utilizing a slurry application process. In this regard, the selected sealant material may be mixed in powder form with a liquid carrier, such as alcohol or water, or in an organic binder with a viscosity tailored to form a flowable slurry. The slurry may then be applied around the mouth or exposed end of slip joints 79 utilizing brushing, spraying, needle dispensing, or similar application technique. The wet-state sealant material flows into slip joints 79 due to capillary action. Additionally, if desired, turbine nozzle 20 can be positioned on its side and spun at a low rate of speed to create centrifugal forces assisting inflow of the wet-state sealant material into slip joints 79. As indicated in FIG. 4, the sealant material is preferably applied in sufficient volume to flow into joints 79 to a depth substantially equivalent to the radial length of airfoil extension 84 to form a robust seal, while leaving an air pocket within the bottom of each slot 78 to allow sliding radial movement of vane 64 with respect to inner ring 62. In certain cases, a heat treatment process may be carried-out after deposition of the wet-state sealant material to evaporate the binder material and, perhaps, to decompose any other organic materials contained within the slurry and thereby form oxidation-resistant seal layer 118. Alternatively, heat treatment of the wet-state sealant material may occur during subsequent processing of turbine nozzle 20 (e.g., during the below-described formation of the TBC coating). Heat treatment may also be carried-out to promote diffusion of oxidation-resistant seal layer 118 into bond coats 110 and 112 (FIG. 4), when present; e.g., in one embodiment, seal layer 118 may be heated to a temperature of approximately 930° C. for a time period of about two hours. During any such heat treatment step, oxidation-resistant seal layer 118 is still preferably not heated above the melt point of the metallic powders contained within the slurry; e.g., any heat treatment step may entail processing temperatures below 1100° C.

After application of oxidation-resistant seal layer 118, a TBC coating (e.g., TBC coating 114 and 116 shown in FIG. 4) may be formed over the gas-exposed surfaces of turbine nozzle 20 (STEP 146). In one embodiment, the TBC coating is applied utilizing a vapor deposition technique, such as electron beam physical vapor deposition. Afterwards, additional processing steps may be performed to complete fabrication of turbine nozzle 20 (STEP 148). Such additional processing steps may include additional heat treatment steps (e.g., aging or diffusion cycles) and/or final machining steps. The resulting turbine nozzle 20 may then be inspected and ultimately installed within a gas turbine engine, such as GTE 18 shown in FIG. 1, utilizing a plurality of bolts or other such fasteners.

The foregoing has thus provided embodiments of a method for manufacturing turbine nozzles including slip joints, which are impregnated with an oxidation-resistant gap fill material and, preferably, a silicon-modified aluminide sealing material. As do other filler materials (e.g., braze materials), such materials impeding gas flow into the radial slip joints during operation of the turbine nozzle, while fracturing to permit relative radial movement between the plurality of vanes and the slip joint ring along the plurality of slip joints. However, in contrast to many braze materials, the silicon-modified aluminide sealing materials provide superior oxidation and corrosion protection in the gas turbine engine environment to minimize gradual surface erosion and thereby maintain the aerodynamic performance of the turbine nozzle over a longer operational lifespan. Additionally, such silicon-modified aluminide sealing materials can be applied in slurry form after assembly of the turbine nozzle thereby enabling (in some embodiments) the nozzle to be produced utilizing a bi-casting process wherein the inner and outer rings are separately cast or otherwise fabricated as monolithic structures prior to turbine nozzle assembly. The silicon-modified aluminide sealing materials are further well-suited for application over and diffusion into platinum-aluminide bond coats, which may be applied prior to assembly of the turbine the nozzle.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a turbine nozzle, comprising:
    providing a support ring, a slip joint ring substantially concentric with the support ring and radially spaced apart therefrom, and a plurality of vanes fixedly coupled to the support ring and extending radially therefrom into a plurality of circumferentially-spaced slots in the slip joint ring to form a plurality of slip joints therewith; and
    impregnating the plurality of slip joints with a silicon-modified aluminide sealing material, the silicon-modified aluminide sealing material impeding gas flow into the radial slip joints during operation of the turbine nozzle, while fracturing to permit relative radial movement between the plurality of vanes and the slip joint ring along the plurality of slip joints;
    wherein the plurality of circumferentially-spaced slots comprises non-penetrating depressions formed in a circumferential surface of the slip joint ring; and
    wherein the silicon-modified aluminide sealing material is applied in sufficient volume to fill annular spaces in the plurality of slip joints, while leaving unfilled radial gaps between terminal ends of the plurality of vanes and floor portions of the non-penetrating depressions, the unfilled radial gaps sized and shaped to accommodate relative radial movement between the turbine nozzle vanes and the slip joint ring during operation of the turbine nozzle.

2. The method of claim 1 wherein impregnating comprises applying the silicon-modified aluminide sealing material in slurry form around the plurality of slip joints such that the silicon-modified aluminide sealing material flows into the plurality of slip joints by capillary action during the impregnation process.

3. The method of claim 2 wherein the silicon-modified aluminide sealing material comprises a metallic powder dissolved in a liquid carrier, the metallic powder composed of at least 50 weight percent aluminum and at least 10 weight percent silicon.

4. The method of claim 1 further comprising slidably attaching the plurality of vanes to the slip joint ring utilizing radial retention pins extending through the floor portions of the non-penetrating depressions, the radial retention pins permitting relative radial movement between the vane and the slip joint ring, while retaining the vanes in the event of airfoil burn-through.

5. The method of claim 4 wherein slidably attaching comprises:
  inserting the radial retention pins through aligning radial bores provided in the slip joint ring and in the plurality of vanes; and
  bonding the radial retention pins to at least one of the slip joint ring and the plurality of vanes.

6. The method of claim 1 further comprising applying a platinum aluminide bond coat over the surfaces of plurality of vanes and surfaces of the slip joint ring defining the plurality of circumferentially-spaced slots prior to impregnating the plurality of slip joints with the silicon-modified aluminide sealing material.

7. The method of claim 1 wherein providing comprises:
  assembling the support ring, the slip joint ring, and the plurality of vanes into the turbine nozzle; and
  bonding the plurality of vanes to the support ring after assembling the support ring, the slip joint ring, and the plurality of vanes into the turbine nozzle and prior to impregnating the plurality of slip joints with the silicon-modified aluminide sealing material.

8. The method of claim 7 wherein the support ring, the slip joint ring, and the plurality of vanes into the turbine nozzle are each separately cast prior to assembly into the turbine nozzle.

9. The method of claim 7 wherein bonding comprises brazing the plurality of vanes to the support ring.

10. The method of claim 7 further comprising applying a bond coat over surfaces of the slip joint ring and the plurality of vanes prior to assembling the support ring, the slip joint ring, and the plurality of vanes into the turbine nozzle.

11. The method of claim 7 further comprising applying a thermal barrier coating over selected surfaces of the support ring, the slip joint ring, and the plurality of vanes, the thermal barrier coating terminating substantially adjacent the silicon-modified aluminide sealing material.

12. A method for manufacturing a turbine nozzle, comprising:
  assembling the turbine nozzle from a support ring, a slip joint ring having a plurality of slots provided therein, and a plurality of vanes extending from the support ring into the plurality of slots provided in the slip joint ring to define a plurality of slip joints;
  prior to assembling the turbine nozzle, forming a first platinum aluminide bond coat on surfaces of the slip joint ring defining the plurality of slots and forming a second platinum aluminide bond coat on terminal end portions of the plurality of vanes;
  bonding the plurality of vanes to the support ring; and
  after bonding the plurality of vanes to the support ring, forming annular seals within the plurality of slip joints and around the terminal end portions of the plurality of vanes, forming comprising:
    dispensing a slurry containing an oxidation-resistant sealing material around the plurality of slip joints in sufficient volume to allow the slurry to flow into the plurality of slip joints by capillary action and contact the first and second platinum aluminide bond coats, while leaving unfilled radial gaps adjacent terminal end portions of the plurality of vanes accommodating relative radial movement between the turbine nozzle vanes and the slip joint ring during operation of the turbine nozzle; and
    heat treating the turbine nozzle to thermally decompose organic materials from the slurry and diffuse the oxidation-resistant sealing material into the first and second platinum aluminide bond coats.

13. The method of claim 12 wherein the oxidation-resistant sealing material comprises a silicon-enriched aluminide material.

14. The method of claim 12 further comprising slidably attaching the plurality of vanes to the slip joint ring utilizing a plurality of radial retention pins, each radial retention pin extending substantially perpendicular to the longitudinal axis of the turbine nozzle.

15. A turbine nozzle, comprising:
  a support ring;
  a slip joint ring substantially concentric with the support ring and radially spaced apart therefrom, the slip joint ring having a plurality of circumferentially-spaced slots therein;
  a plurality of vanes fixedly coupled to the support ring and extending radially therefrom into the plurality of circumferentially-spaced slots;
  a plurality of radial slip joints formed between the plurality of vanes and the plurality of circumferentially-spaced slots; and
  a silicon-modified aluminide sealing material impregnated into the plurality of radial slip joints, the silicon-modified aluminide sealing material impeding gas flow into the radial slip joints during operation of the turbine nozzle, while fracturing to permit relative radial movement between the plurality of vanes and the slip joint ring;
  wherein the plurality of circumferentially-spaced slots comprises non-penetrating depressions formed in a circumferential surface of the slip joint ring and having floor portions; and
  wherein the silicon-modified aluminide sealing material fills annular spaces in the plurality of slip joints to sealingly enclose unfilled radial gaps located between terminal ends of the plurality of vanes and the floor portions of the non-penetrating depressions, the unfilled radial gaps sized and shaped to accommodate relative radial movement between the turbine nozzle vanes and the slip joint ring during operation of the turbine nozzle.

16. The turbine nozzle of claim 15 wherein the support ring comprises a monolithic structure having a plurality of openings therein, and wherein the plurality of vanes are inserted through the plurality of openings and bonded to the surfaces of the support ring defining the plurality of openings.

17. The turbine nozzle of claim 15 further comprising a platinum aluminide bond coat formed over selected surfaces of the plurality of radial slip joints, the silicon-modified aluminide sealing material applied over the platinum aluminide bond coat.

18. The turbine nozzle of claim 15 further comprising a plurality of radial retention pins extending from the plurality of vanes, through the unfilled air pockets, and to the slip joint ring, the plurality of radial retention pins permitting relative radial movement between the plurality of vanes and the slip joint ring, while retaining the plurality of vanes in the event of airfoil burn-through.

19. The turbine nozzle of claim 18 wherein the plurality of radial retention pins comprises enlarged pin heads contained within the plurality of vanes.

20. The turbine nozzle of claim 18 further comprising a platinum aluminide bond coat bonded to the silicon-modified aluminide sealing material and extending over the floor portions of the non-penetrating depressions.

* * * * *